(12) United States Patent
Bangerter et al.

(10) Patent No.: US 10,808,937 B2
(45) Date of Patent: Oct. 20, 2020

(54) GAS TURBINE ENGINE WALL ASSEMBLY WITH OFFSET RAIL

(71) Applicant: United Technologies Corporation, Farmington, CT (US)

(72) Inventors: James P. Bangerter, Manchester, CT (US); Kevin J. Low, Portland, OR (US)

(73) Assignee: Raytheon Technologies Corporation, Farmington, CT (US)

( * ) Notice: Subject to any disclaimer, the term of this patent is extended or adjusted under 35 U.S.C. 154(b) by 267 days.

(21) Appl. No.: 15/032,354

(22) PCT Filed: Aug. 29, 2014

(86) PCT No.: PCT/US2014/053515
§ 371 (c)(1),
(2) Date: Apr. 27, 2016

(87) PCT Pub. No.: WO2015/065579
PCT Pub. Date: May 7, 2015

(65) Prior Publication Data
US 2016/0265784 A1    Sep. 15, 2016

Related U.S. Application Data

(60) Provisional application No. 61/899,546, filed on Nov. 4, 2013.

(51) Int. Cl.
*F23R 3/00* (2006.01)
*F23R 3/60* (2006.01)
*F02C 7/12* (2006.01)
*F02K 1/82* (2006.01)
*F02C 7/24* (2006.01)
*F23R 3/50* (2006.01)

(52) U.S. Cl.
CPC .................. *F23R 3/60* (2013.01); *F02C 7/12* (2013.01); *F02C 7/24* (2013.01); *F02K 1/822* (2013.01); *F23R 3/002* (2013.01); *F23R 3/50* (2013.01); *F23R 2900/03041* (2013.01); *F23R 2900/03044* (2013.01); *Y02T 50/675* (2013.01)

(58) Field of Classification Search
CPC .. F02C 7/12; F23R 3/002; F23R 2900/03044; F23R 2900/00017; F23R 2900/00012; F23R 3/06; F02K 1/822; F28F 7/00; F28F 1/00
See application file for complete search history.

(56) References Cited

U.S. PATENT DOCUMENTS 5,363,643 A * 11/1994 Halila ..................... F23R 3/002
60/752
5,758,503 A *  6/1998 DuBell ................... F23R 3/002
60/752

(Continued)

OTHER PUBLICATIONS

Extended EP Search Report dated Oct. 25, 2016.

*Primary Examiner* — Gerald L Sung
*Assistant Examiner* — Rene D Ford
(74) *Attorney, Agent, or Firm* — Getz Balich LLC

(57) ABSTRACT

A liner panel within a gas turbine engine includes a perimeter rail that defines a first height from a cold side. The liner panel also includes an intermediate rail that defines a second height from the cold side, where the second height is less than the first height.

11 Claims, 10 Drawing Sheets

(56) References Cited

U.S. PATENT DOCUMENTS

| | | | |
|---|---|---|---|
| 5,782,294 A * | 7/1998 | Froemming | F01D 5/288 165/168 |
| 6,397,765 B1 * | 6/2002 | Becker | F23M 5/04 110/336 |
| 6,408,628 B1 * | 6/2002 | Pidcock | F23R 3/002 60/752 |
| 7,093,439 B2 | 8/2006 | Pacheco-Tougas et al. | |
| 7,493,767 B2 | 2/2009 | Bunker et al. | |
| 7,788,928 B2 | 9/2010 | De Sousa et al. | |
| 8,113,004 B2 | 2/2012 | Carlisle et al. | |
| 8,256,224 B2 | 9/2012 | Garry et al. | |
| 8,266,914 B2 | 9/2012 | Hawie et al. | |
| 8,359,865 B2 | 1/2013 | Dierberger et al. | |
| 8,359,866 B2 | 1/2013 | Dierberger et al. | |
| 8,393,155 B2 | 3/2013 | Piper et al. | |
| 8,408,010 B2 | 4/2013 | Garry et al. | |
| 9,518,737 B2 * | 12/2016 | Pidcock | F23R 3/002 |
| 2002/0116929 A1 | 8/2002 | Snyder | |
| 2002/0184892 A1 | 12/2002 | Calvez | |
| 2003/0101731 A1 * | 6/2003 | Burd | F23M 5/02 60/796 |
| 2004/0074239 A1 * | 4/2004 | Tiemann | F23M 5/02 60/798 |
| 2005/0022531 A1 * | 2/2005 | Burd | F23R 3/002 60/752 |
| 2005/0086940 A1 | 4/2005 | Coughlan, III et al. | |
| 2006/0005543 A1 | 1/2006 | Burd | |
| 2007/0144178 A1 | 6/2007 | Burd et al. | |
| 2007/0186558 A1 | 8/2007 | De Sousa et al. | |
| 2007/0186559 A1 | 8/2007 | De Sousa et al. | |
| 2008/0264065 A1 | 10/2008 | Gerendas | |
| 2010/0095679 A1 | 4/2010 | Rudrapatna et al. | |
| 2012/0255311 A1 * | 10/2012 | Miyake | F23R 3/005 60/806 |
| 2013/0055722 A1 * | 3/2013 | Verhiel | F23R 3/007 60/772 |
| 2013/0192233 A1 | 8/2013 | Eastwood et al. | |
| 2013/0247575 A1 * | 9/2013 | Patel | F02C 7/24 60/752 |
| 2013/0251513 A1 * | 9/2013 | Stastny | B23K 1/0018 415/175 |
| 2013/0259664 A1 * | 10/2013 | Denis | B23K 31/02 415/182.1 |

* cited by examiner

GAS TURBINE ENGINE WALL ASSEMBLY WITH OFFSET RAIL

CROSS-REFERENCE TO RELATED APPLICATION

This application claims priority to PCT Patent Application No. PCT/US14/053515 filed Aug. 29, 2014, which claims priority to U.S. Patent Appln. Ser. No. 61/899,546 filed Nov. 4, 2013, which are hereby incorporated herein by reference in their entireties.

BACKGROUND

The present disclosure relates to a gas turbine engine and, more particularly, to a wall assembly therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, severe temperatures are observed in the combustor section such that cooling is required to meet service life requirements. The combustor section typically includes an outer shell lined with heat shields often referred to as liner panels. In certain arrangements, dilution holes in the liner panel communicate with respective dilution holes in the outer shell to direct cooling air for dilution of the combustion gases. In addition to the dilution holes, the outer shell may also have relatively smaller air impingement holes to direct cooling air between the liner panels and the outer shell to cool the cold side of the liner panels. This cooling air exits effusion holes through of the liner panels to form a film on a hot side of the liner panels as a barrier against the hot combustion gases.

With lower emissions requirements and higher combustor temperatures, the amount of cooling air needs to be reduced and the effectiveness thereof needs to be increased which increases the necessity of sealing between the shell and liner panel. The relatively large tolerances between the cast liner panels and sheet metal shell complicated sealing therebetween.

SUMMARY

A liner panel within a gas turbine engine, according to one disclosed non-limiting embodiment of the present disclosure, includes a perimeter rail that defines a first height from a cold side. The liner panel also includes an intermediate rail that defines a second height from the cold side, where the second height is less than the first height.

In a further embodiment of the present disclosure, a multiple of studs are included that extend from the cold side.

In a further embodiment of any of the foregoing embodiments of the present disclosure, the multiple of studs extend from the intermediate rail.

In a further embodiment of any of the foregoing embodiments of the present disclosure, the multiple of studs include a first row of studs that extend from the cold side generally forward of the intermediate rail and a second row of studs that extend from the cold side generally aft of the intermediate rail.

In a further embodiment of any of the foregoing embodiments of the present disclosure, the perimeter rail includes a forward circumferential rail; an aft circumferential rail axial spaced from the forward circumferential rail; and first and second axial end rails between the forward circumferential rail and the aft circumferential rail.

In a further embodiment of any of the foregoing embodiments of the present disclosure, the intermediate rail is generally parallel to the forward circumferential rail and the aft circumferential rail.

In a further embodiment of any of the foregoing embodiments of the present disclosure, the second height is less than the first height by about 0.005-0.020 inches (0.1-0.5 mm).

A wall assembly within a gas turbine engine, according to another disclosed non-limiting embodiment of the present disclosure, includes a multiple of liner panels mounted to a support shell. At least one of the multiple of liner panel includes a perimeter rail that defines a first height from a cold side and an intermediate rail that defines a second height from the cold side, where the second height is less than the first height.

In a further embodiment of any of the foregoing embodiments of the present disclosure, the liner panel is within a combustor of the gas turbine engine.

In a further embodiment of any of the foregoing embodiments of the present disclosure, a multiple of studs extend from the liner panel through the support shell.

In a further embodiment of any of the foregoing embodiments of the present disclosure, the multiple of studs extend from the intermediate rail.

In a further embodiment of any of the foregoing embodiments of the present disclosure, the multiple of studs include a first row of studs that extend from the cold side generally forward of the intermediate rail and a second row of studs that extend from the cold side generally aft of the intermediate rail.

In a further embodiment of any of the foregoing embodiments of the present disclosure, the perimeter rail includes a forward circumferential rail; an aft circumferential rail axial spaced from the forward circumferential rail; and first and second axial end rails between the forward circumferential rail and the aft circumferential rail.

In a further embodiment of any of the foregoing embodiments of the present disclosure, the intermediate rail is generally parallel to the forward circumferential rail and the aft circumferential rail.

In a further embodiment of any of the foregoing embodiments of the present disclosure, the second height is less than the first height by about 0.005-0.020 inches (0.1-0.5 mm).

A method of assembling a wall assembly within a gas turbine engine, according to another disclosed non-limiting embodiment of the present disclosure, includes locating a stud that extends from a cold side of a liner panel through a support shell. The method also includes threading a fastener onto the stud to at least partially close a preassembly gap between an intermediate rail and the support shell.

In a further embodiment of any of the foregoing embodiments of the present disclosure, the method includes deflecting the support shell toward the liner panel.

In a further embodiment of any of the foregoing embodiments of the present disclosure, the method includes deflecting the support shell toward the liner panel adjacent to the intermediate rail.

In a further embodiment of any of the foregoing embodiments of the present disclosure, the method includes deflecting the support shell relative to a perimeter rail that extends from the cold side.

In a further embodiment of any of the foregoing embodiments of the present disclosure, the method includes deflecting the support shell within the perimeter rail.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
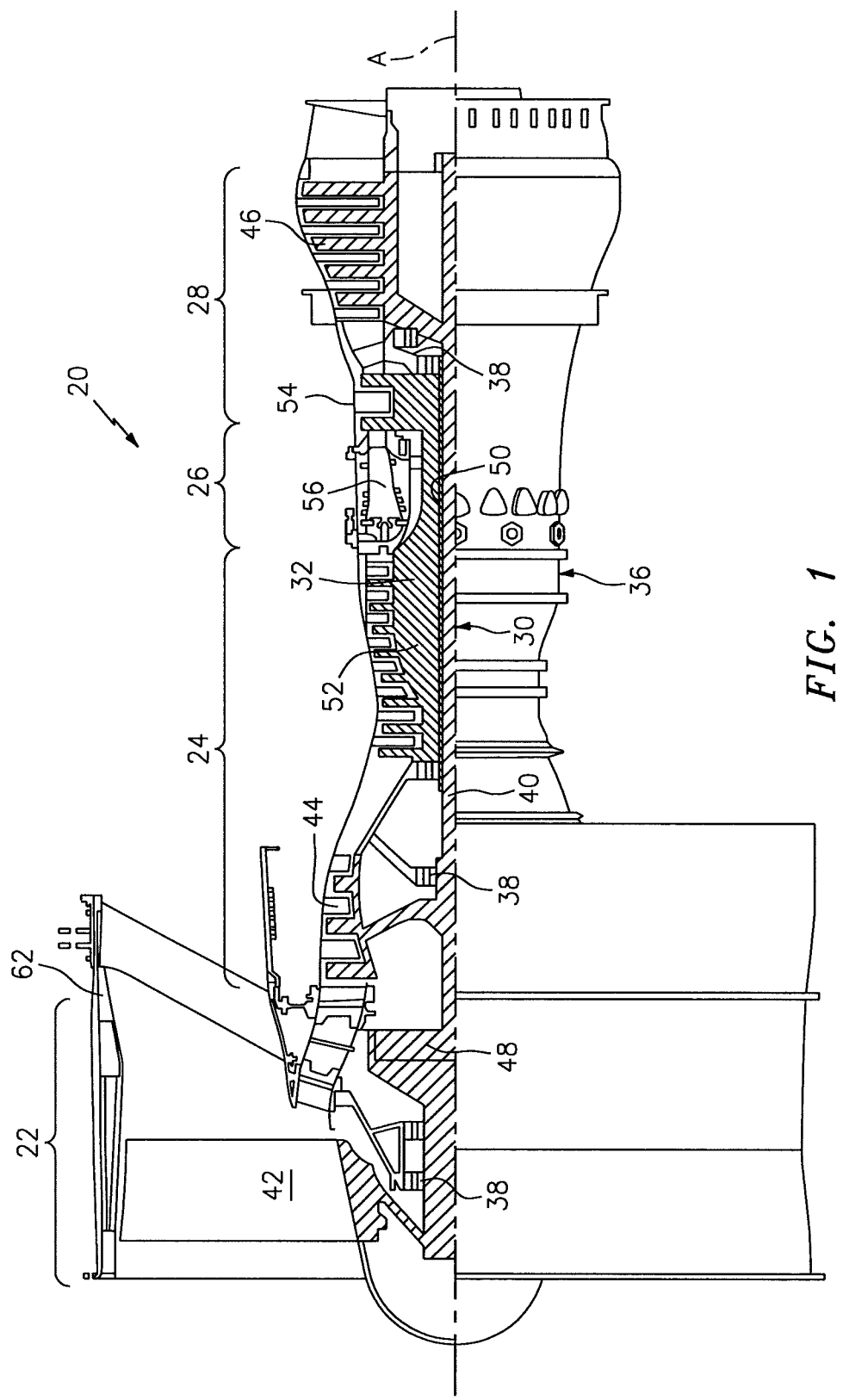
FIG. 1 is a schematic cross-section of an example gas turbine engine architecture.
Figure 2:
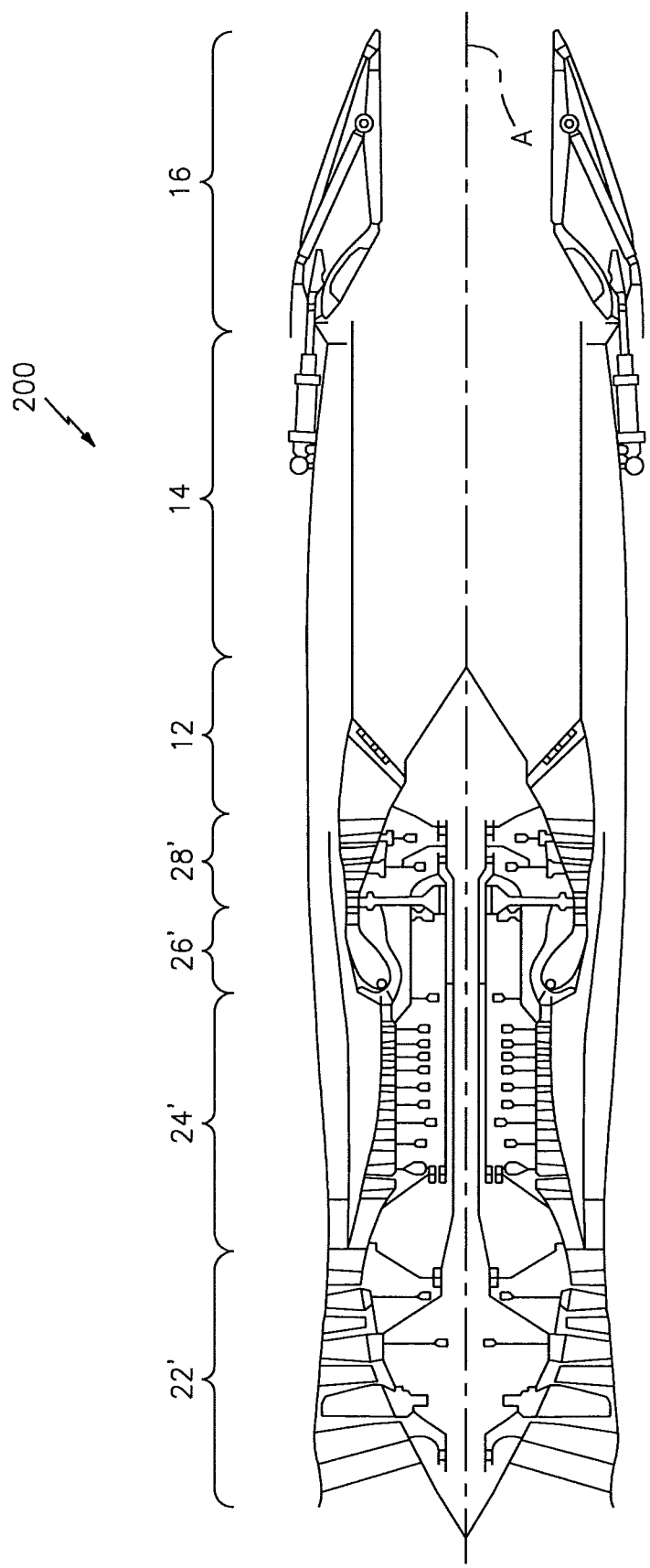
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
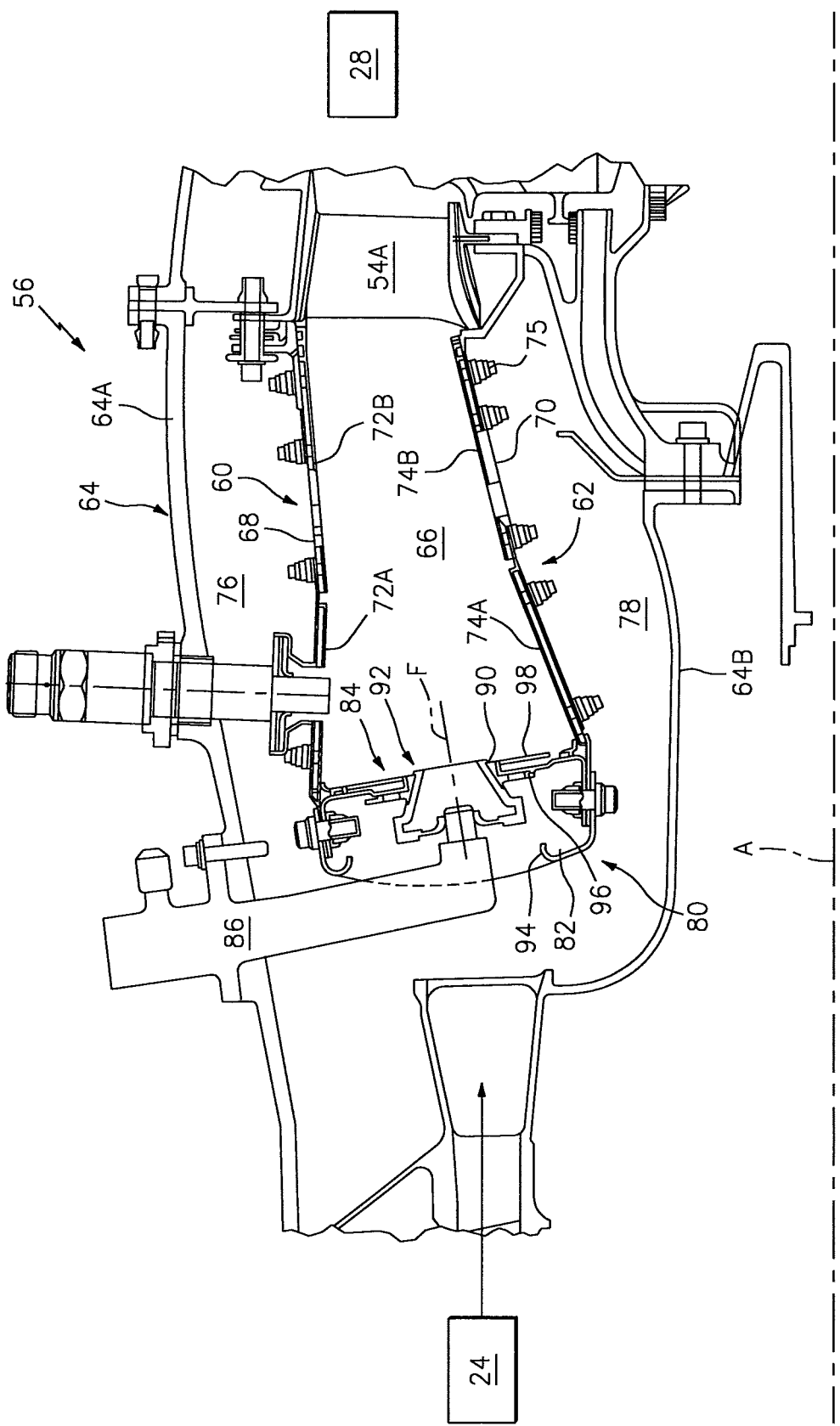
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Figure 4:
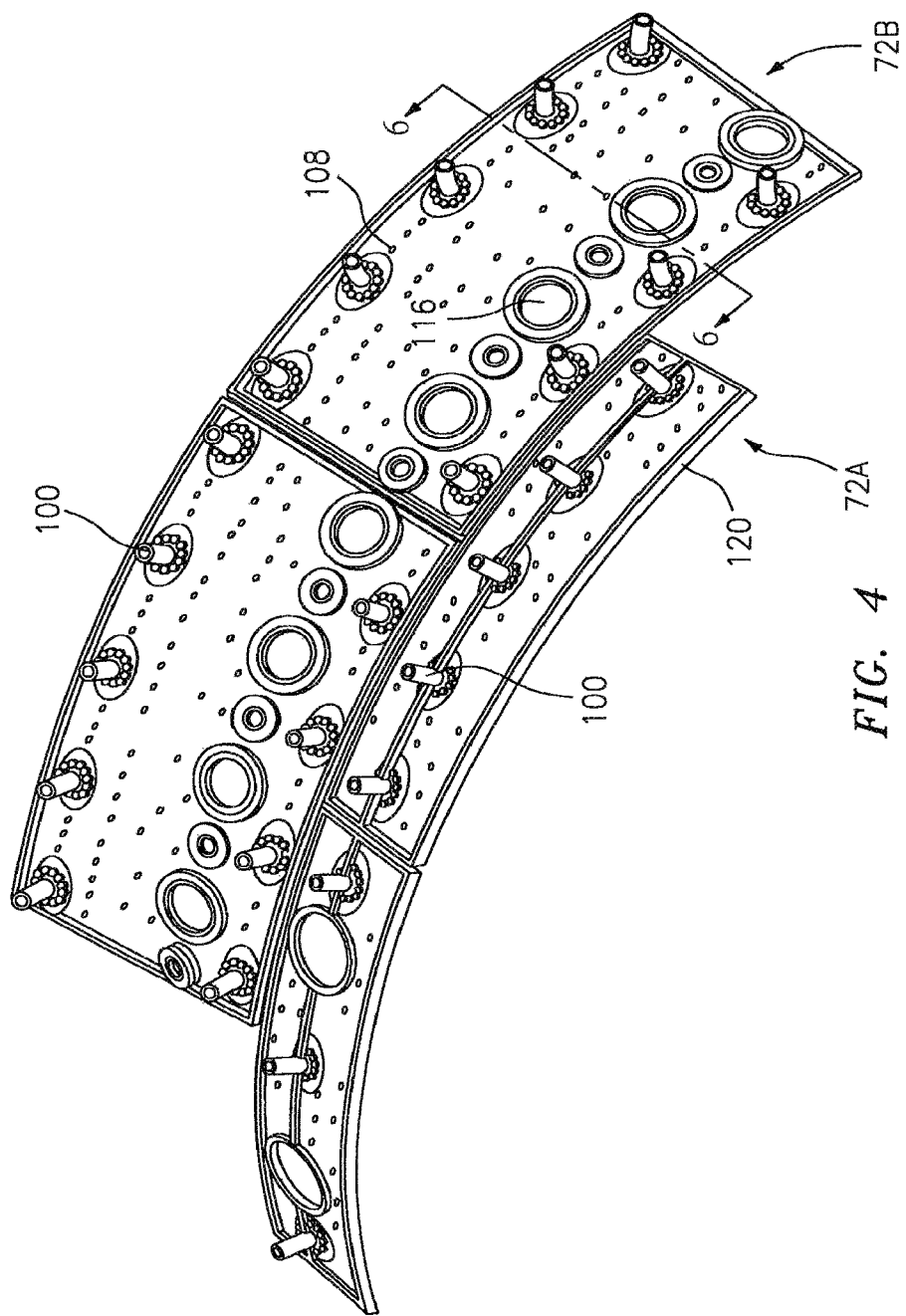
FIG. 4 is a perspective view of a portion of an outer liner panel array.
Figure 5:
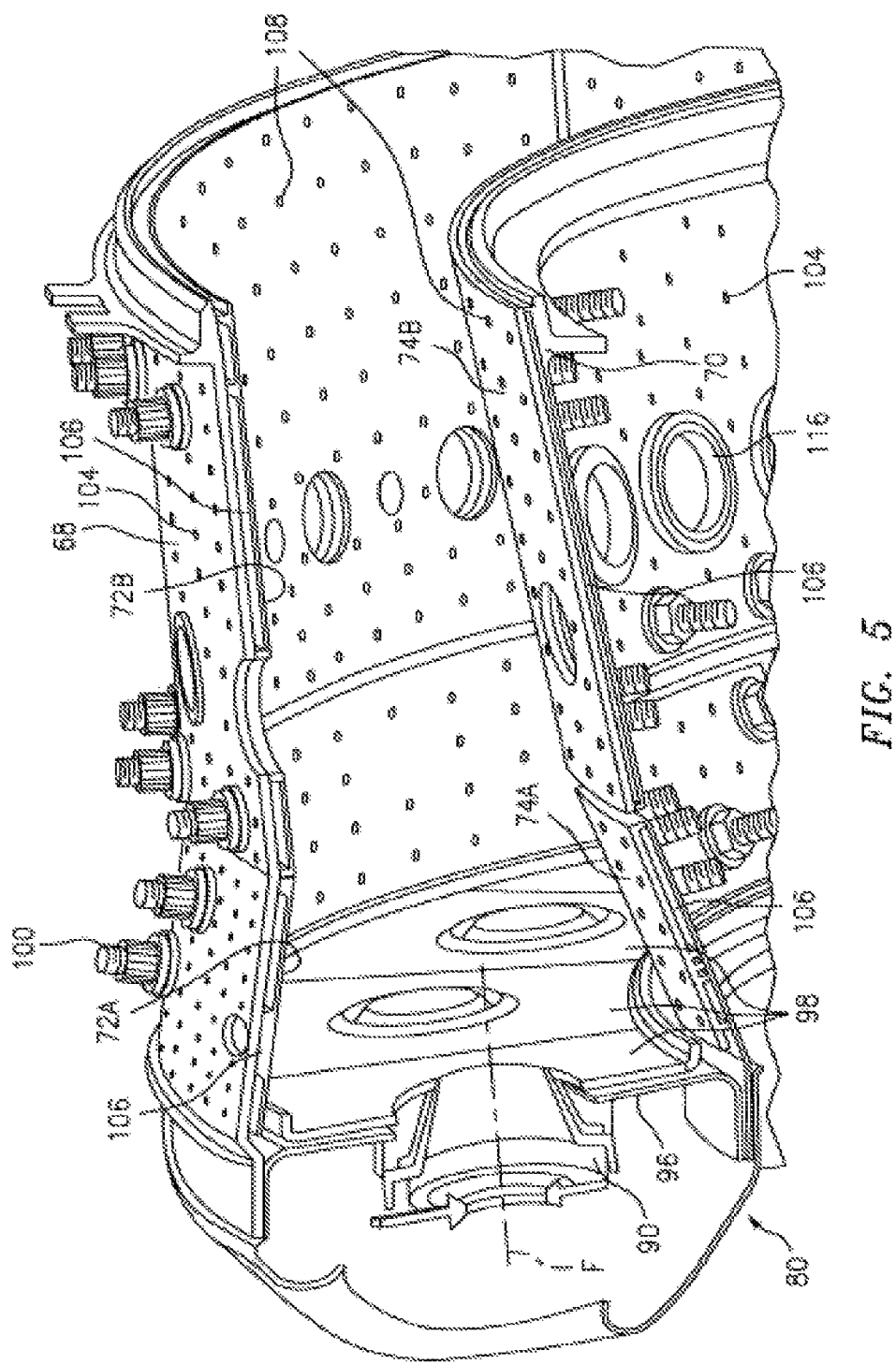
FIG. 5 is an expanded perspective longitudinal schematic sectional view of a combustor section.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto that are arranged to form a liner array (see FIG. 4). The support shells 68, 70 may be manufactured by, for example, the hydroforming of a sheet metal alloy to provide the generally cylindrical outer shell 68 and inner shell 70 (see FIG. 5). Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 6:
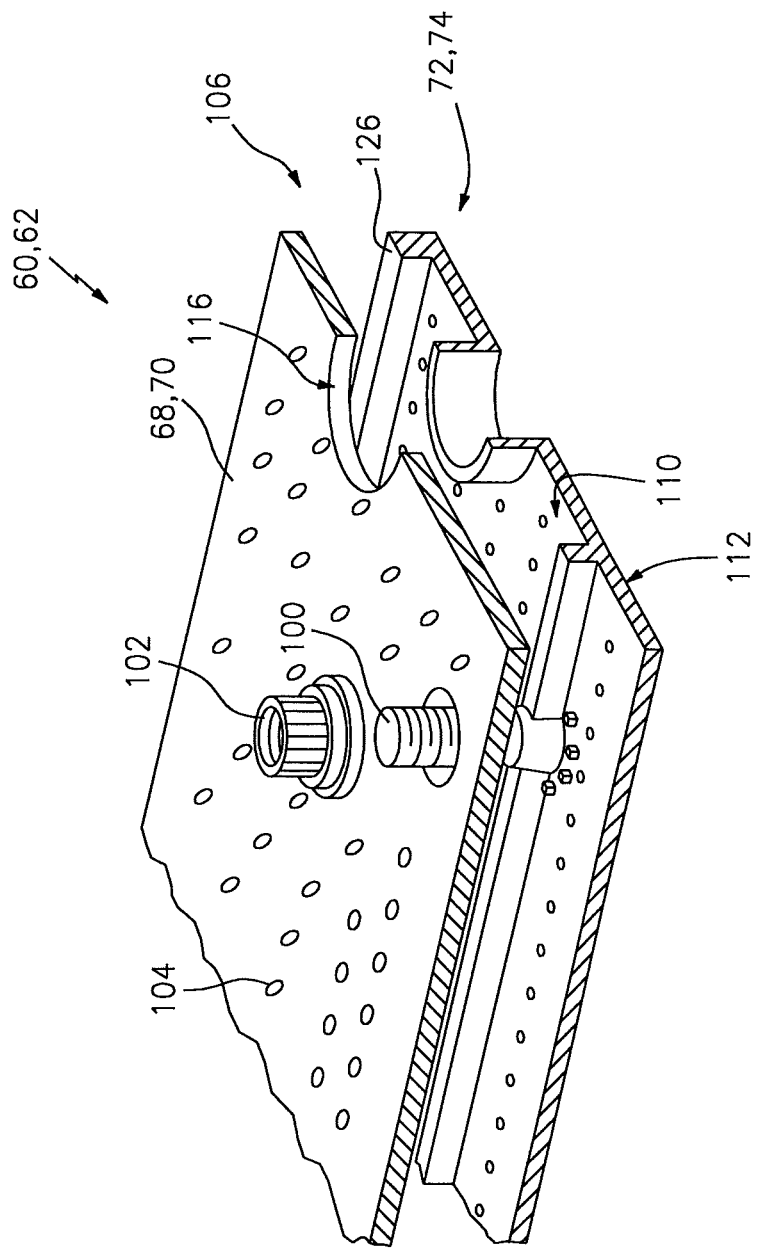
FIG. 6 is an expanded partial sectional view of a portion of a combustor wall assembly according to one disclosed non-limiting embodiment.

With reference to FIG. 6, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Liner (IFF) assembly.

The effusion passages 108 allow the air to pass from the cavities 106 defined in part by a cold side 110 of the liner panels 72, 74 to a hot side 112 of the liner panels 72, 74 and thereby facilitate the formation of a thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 7:
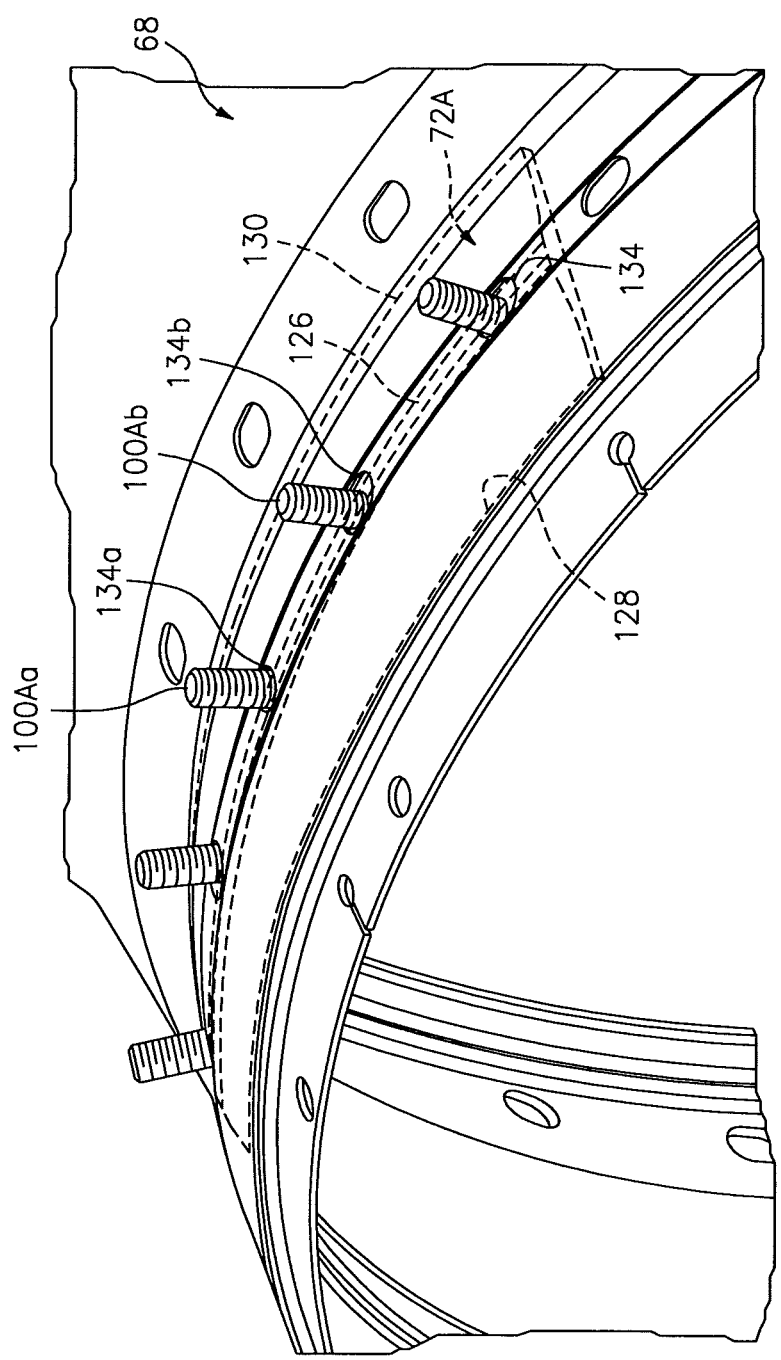
FIG. 7 is a perspective partial view of a liner panel mounted to a support shell.

With reference to FIG. 7, in one disclosed non-limiting embodiment, each of the respective support shells 68, 70 are deflected and thereby at least partially non-parallel with respect to the forward liner panels 72A, 74A. Although the forward liner panels 72A, and the respective forward portion of the outer support shell 68 will be specifically described and illustrated in each of the disclosed non-limiting embodiments, it should be appreciated that the inner support shell 70 as well as various other wall assemblies within a gas turbine engine such as within the walls of the augmentor section 12, the exhaust duct section 14 and the nozzle section 16 (see FIG. 2) may alternatively or additionally benefit herefrom. That is, engine sections other than the combustor section 26 which utilize a support shell, liner panel type wall arrangement will also benefit herefrom.

In this disclosed non-limiting embodiment, each of the forward liner panels 72A includes a row of studs 100A and an intermediate rail 126 located between a forward circumferential rail 128 and an aft circumferential rail 130. It should be appreciated that although the intermediate rail 126 is illustrated in the disclosed non-limit embodiment as generally parallel to the forward and aft circumferential rail 128, 130, the intermediate rail 126 may alternatively be non-parallel thereto.

Each of the forward liner panels 72A include a single row of studs 100A (Five shown) that extend through respective stud apertures 134 in the support shell 68. Each of the studs 100A may be at least partially surrounded by posts 132 to at least partially support and operate as stand-offs between the support shell 68 and the respective forward liner panels 72A. A center or "king" stud 100Aa is received within a central circular stud aperture 134a while the remainder of the studs 100Ab are received within elongated apertures 134b to facilitate operational thermal growth relative to the center or "king" stud 100Aa.

Figure 8:
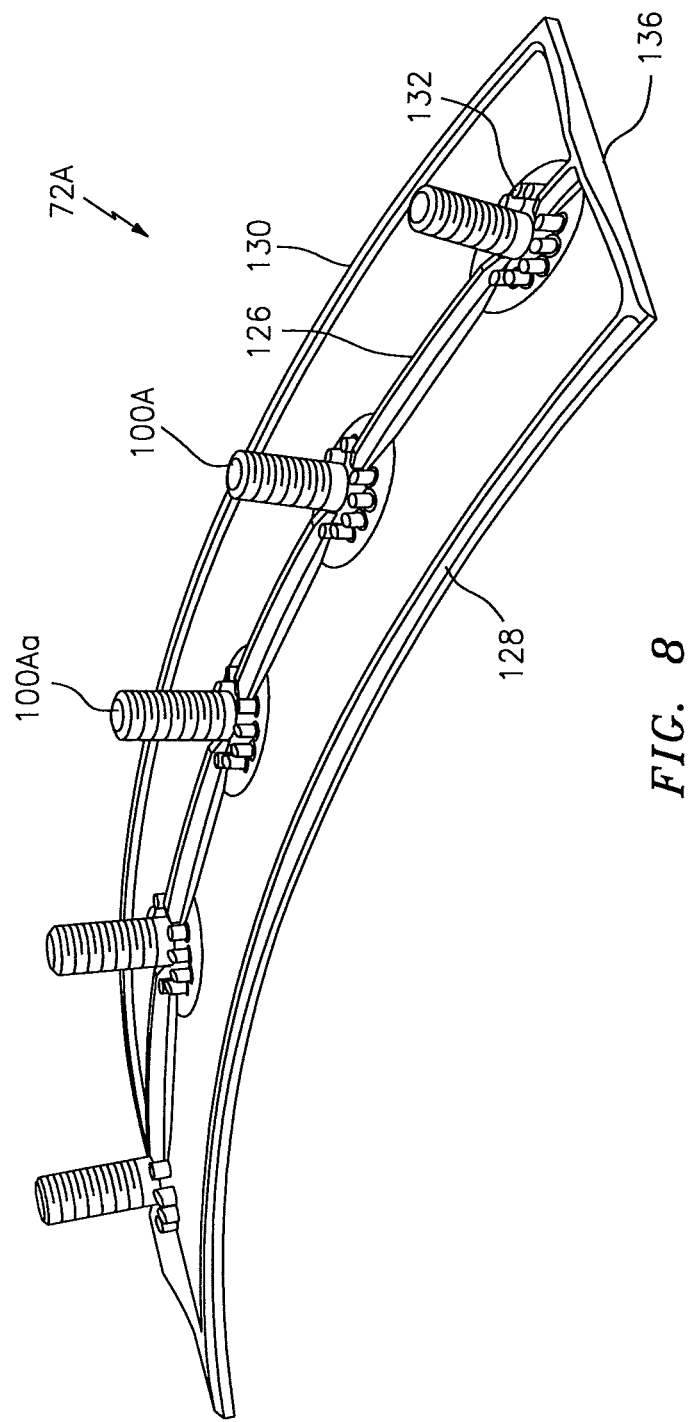
FIG. 8 is a perspective cold side view of a liner panel according to one disclosed non-limiting embodiment.
Figure 9:
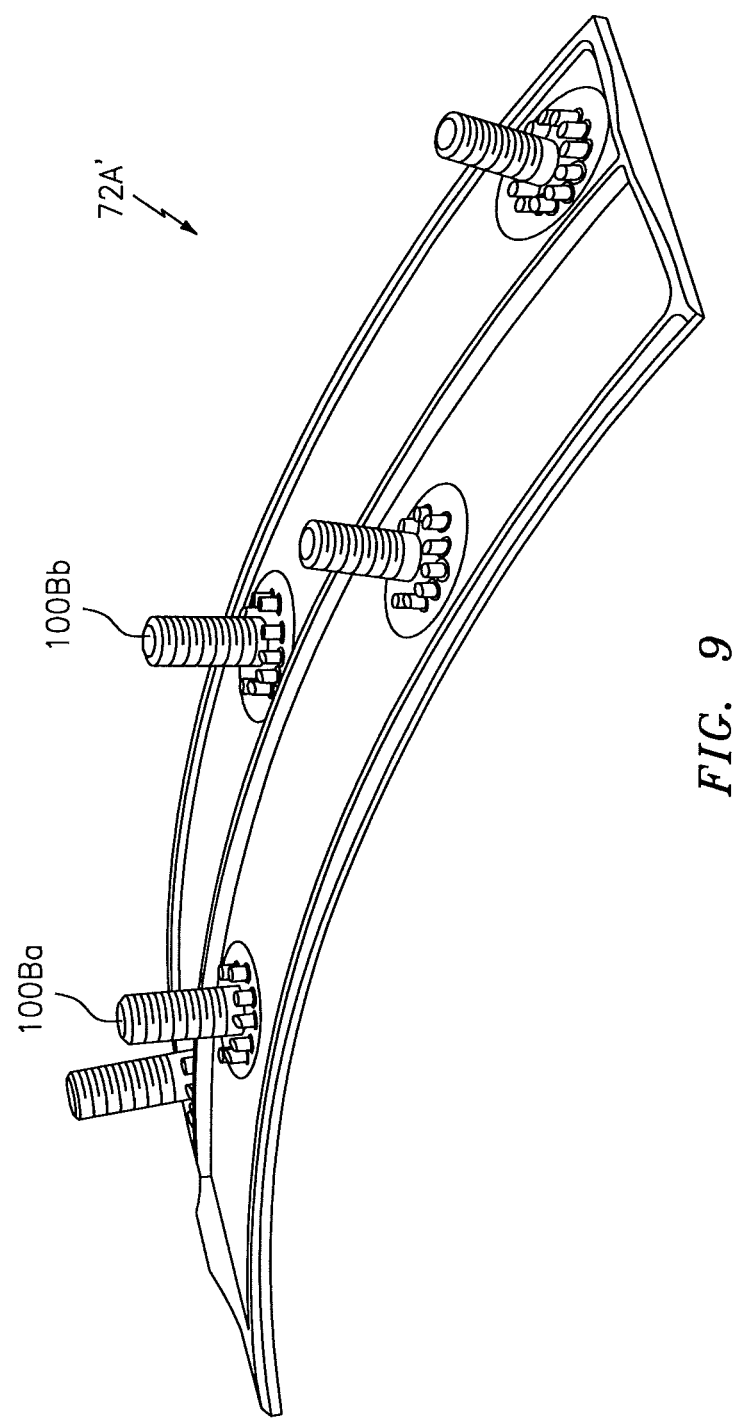
FIG. 9 is a perspective cold side view of a liner panel according to one disclosed non-limiting embodiment.

With reference to FIG. 8, in one disclosed non-limiting embodiment, the multiple of studs 100A extend generally along the intermediate rail 126. That is, the studs 100A at least partially form the intermediate rail 126. In another disclosed non-limiting embodiment, a forward row of studs 100Bb extend from the cold side 110 on one side of the intermediate rail 126 and a second row of studs 100Ba that extend from the cold side 110 on a side of the intermediate rail 126 opposite the forward row of studs 100Bb (see FIG. 9).

Axial end rails 136 circumferentially close-out each forward liner panels 72A with respect to the support shell 68. That is, the forward circumferential rail 128 and the aft circumferential rail 130 are located at relatively constant curvature axial interfaces while the axial end rails 136 extend across an axial length of the support shell 68 to form a perimeter rail that seals the periphery of each forward liner panels 72A with respect to the respective support shell 68.

Figure 10:
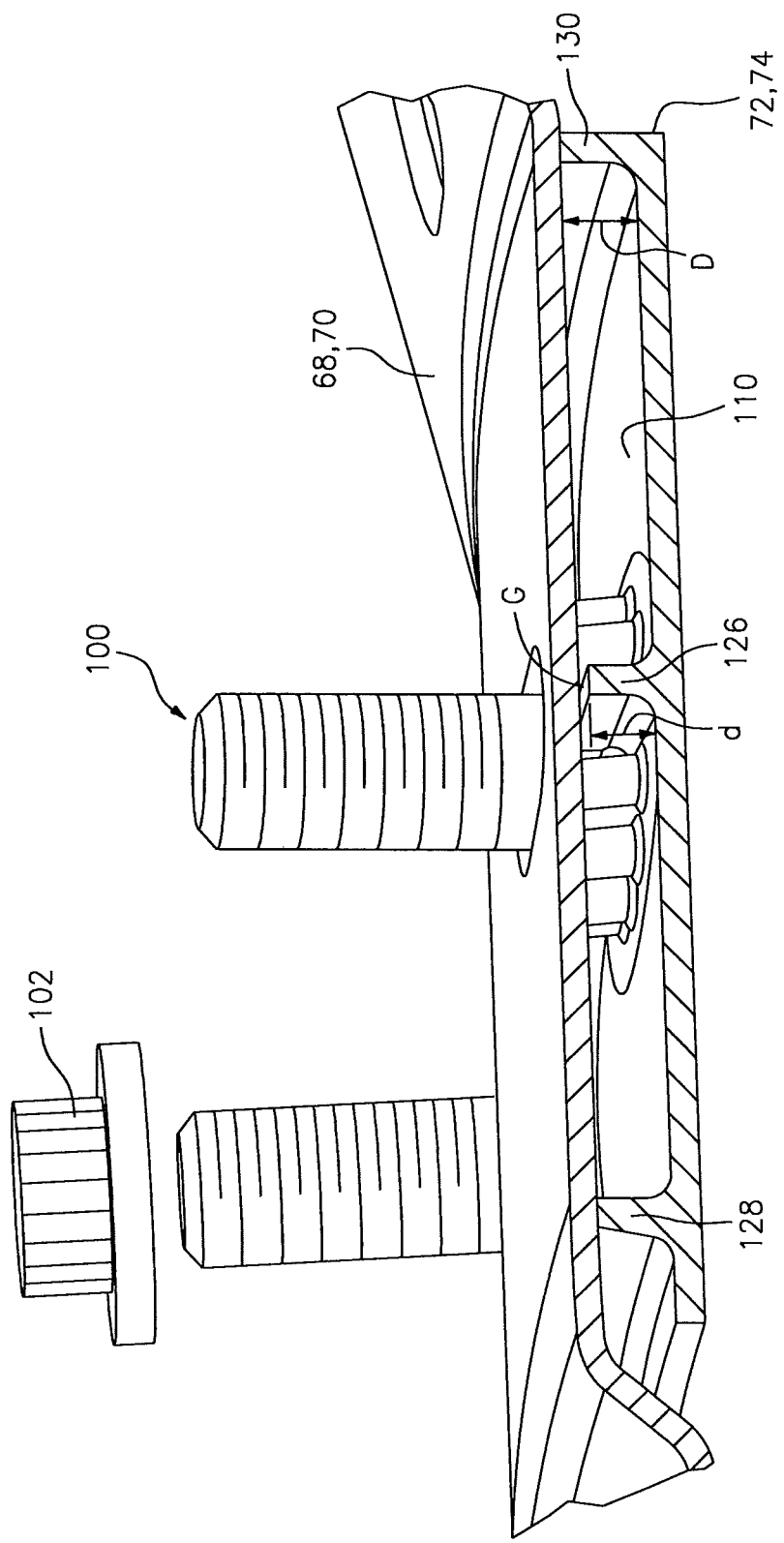
FIG. 10 is an expanded longitudinal sectional view of a forward outer portion of a combustor wall assembly with the liner panel of FIG. 8 according to one disclosed non-limiting embodiment.

With reference to FIG. 10, the intermediate rail 126 is offset from the cold side 110 with respect to the forward circumferential rail 128, the aft circumferential rail 130 and the axial end rails 136. That is, the intermediate rail 126 extends for a lesser distance d from the cold side 110 as compared to the forward circumferential rail 128, the aft circumferential rail 130 and the axial end rails 136 which extend a distance D that is greater than distance d. In one disclosed non-limiting embodiment, the typical offset is about 0.005-0.020 inches (0.1-0.5 mm).

The reduced height intermediate rail 126 thereby forms a pre-assembly gap G that will cause the forward liner panels 72A and the respective support shell 68 to deflect toward each other as the fasteners 102 are tightened onto the studs 100 to at least partially close the pre-assembly gap G. This deflects the support shell 68 adjacent to the reduced height intermediate rail 126 and produces a tight seal between the perimeter rail 120 (see FIG. 4) and the support shell 68 to increase sealing therebetween. The reduced height intermediate rail 126 thereby reduces leakage to facilitate formation of a relatively larger pressure drops across the liner panels 72, 74 and increase cooling effectiveness.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A wall assembly within a gas turbine engine, comprising:
   a support shell; and
   a liner panel mounted to the support shell, the liner panel comprising:
      a perimeter rail that defines a first height from a cold side;
      an intermediate rail that defines a second height from the cold side, wherein the second height is less than the first height;
      a multiple of studs that extend from the cold side; and
      a multiple of stand-off posts disposed proximate each stud of the multiple of studs and extending from the cold side, wherein the perimeter rail includes a forward circumferential rail, an aft circumferential rail axially spaced from the forward circumferential rail and first and second axial end rails between the forward circumferential rail and the aft circumferential rail, wherein the intermediate rail is parallel to the forward circumferential rail and the aft circumferential rail, wherein the multiple of studs include a first row of studs that extend from the cold side forward of the intermediate rail and a second row of studs that extend from the cold side aft of the intermediate rail and wherein the first row of studs is disposed between and spaced from the forward circumferential rail and the intermediate rail and the second row of studs is disposed between and spaced from the aft circumferential rail and the intermediate rail, and wherein based on the second height being less than the first height, the intermediate rail forms a pre-assembly gap between the intermediate rail and the support shell, and a multiple of fasteners tightened onto the multiple of studs at least partially closes the pre-assembly gap with the support shell and the liner panel deflected towards each other.

2. The liner panel as recited in claim 1, wherein the second height is less than the first height by 0.005-0.020 inches (0.1-0.5 mm).

3. The liner panel of claim 1, wherein each stud of the second row of studs is disposed between adjacent studs of the first row of studs in a circumferential direction.

4. A wall assembly within a gas turbine engine, comprising:
   a support shell; and
   a multiple of liner panels mounted to the support shell, at least one of the multiple of liner panels includes a perimeter rail that defines a first height from a cold side and an intermediate rail that defines a second height from the cold side, wherein the second height is less than the first height;
   a multiple of studs that extend from each liner panel of the multiple of liner panels through the support shell; and
   a multiple of posts disposed proximate each stud of the multiple of studs,
   wherein the perimeter rail includes a forward circumferential rail, an aft circumferential rail axially spaced from the forward circumferential rail and first and second axial end rails between the forward circumferential rail and the aft circumferential rail,
   wherein the intermediate rail is parallel to the forward circumferential rail and the aft circumferential rail,
   wherein the multiple of posts are configured as stand-offs between the support shell and the multiple of liner panels,
   wherein the multiple of studs include a first row of studs that extend from the cold side forward of the intermediate rail and a second row of studs that extend from the cold side aft of the intermediate rail and wherein the first row of studs is disposed between and spaced from the forward circumferential rail and the intermediate rail and the second row of studs is disposed between and spaced from the aft circumferential rail and the intermediate rail, and wherein the intermediate rail forms a pre-assembly gap between the intermediate rail and the support shell, and a multiple of fasteners tightened onto the multiple of studs at least partially closes the pre-assembly gap with the support shell and the at least one of the multiple of liner panels deflected towards each other.

5. The wall assembly as recited in claim 4, wherein the liner panel is within a combustor of the gas turbine engine.

6. The wall assembly as recited in claim 4, wherein the second height is less than the first height by 0.005-0.020 inches (0.1-0.5 mm).

7. The wall assembly of claim 4, wherein each stud of the second row of studs is disposed between adjacent studs of the first row of studs in a circumferential direction.

8. A method of assembling a wall assembly within a gas turbine engine, comprising:
   locating a multiple of studs that extend from a cold side of a liner panel through a support shell; and
   threading a multiple of fasteners onto the respective multiple of studs to at least partially close a preassembly gap between an intermediate rail and the support shell causing the liner panel and the support shell to deflect toward each other as the multiple of fasteners are tightened onto the respective multiple of studs,
   wherein the liner panel includes a perimeter rail and a multiple of stand-off posts disposed proximate each stud of the multiple of studs,
   wherein the perimeter rail includes a forward circumferential rail, an aft circumferential rail axially spaced from the forward circumferential rail and first and second axial end rails between the forward circumferential rail and the aft circumferential rail,
   wherein the intermediate rail is parallel to the forward circumferential rail and the aft circumferential rail,
   wherein the perimeter rail defines a first height from the cold side and the intermediate rail defines a second height from the cold side, and wherein the second height is less than the first height thereby forming the pre-assembly gap, and
   wherein the multiple of studs include a first row of studs that extend from the cold side forward of the intermediate rail and a second row of studs that extend from the cold side aft of the intermediate rail and wherein the first row of studs is disposed between and spaced from the forward circumferential rail and the intermediate rail and the second row of studs is disposed between and spaced from the aft circumferential rail and the intermediate rail.

9. The method as recited in claim 8, wherein the deflecting includes deflecting the support shell relative to the perimeter rail, and wherein the perimeter rail extends from the cold side.

10. The method as recited in claim 9, further comprising deflecting the support shell within the perimeter rail.

11. The method of claim 8, wherein each stud of the second row of studs is disposed between adjacent studs of the first row of studs in a circumferential direction.

* * * * *